United States Patent Office 3,075,924
Patented Jan. 29, 1963

3,075,924
DETERGENT COMPOSITION
Martin Rubin, Silver Spring, Md.
(3218 Pauline, Chevy Chase, Md.)
No Drawing. Filed July 24, 1958, Ser. No. 750,574
3 Claims. (Cl. 252—152)

This invention relates to a new and improved composition of matter.

The composition comprises a mixture of ingredients, each of which has a necessary function. Together these ingredients have an action far greater than might be anticipated from their individual properties.

The foremost, perhaps the key ingredient is the unfermented juice from the leaves of Agave plants, particularly that from *Agave sisalina* and *Agave fourcroydes*.

At the present time these plants are cultivated in tropical regions for the valuable fiber in the plant leaf. The juice of the plant leaf, obtained in the course of the processsing of the leaf for fiber, is presently a valueless by-product of fiber manufacture.

Under ordinary circumstances the leaf juice immediately on its expression from the plant begins a process of vigorous fermentation. The fermentation process breaks down the organic polysaccharides of the juice to smaller molecular sizes, thus rendering the juice completely valueless for purposes of the present invention. It should be noted that self-fermented juices of the cactus family and of the Agave family have been described in scientific literature as useful for other purposes than those contemplated in this invention. For use in the present composition the juice must be maintained in a natural non-fermented state.

At least two practical methods are available for preserving freshly pressed sisal juice against fermentation. To avoid immediate self-fermentation the juice may be treated with caustic to raise the normal pH of 4.0 to 5.0 to 8.0 or above. At the higher pH, fermentation is inhibited and the raw juice is maintained in an undecomposed state almost indefinitely. Alternatively, the raw juice may immediately be heated to boiling and maintained at or near the boiling state, say 70°–100° C. for a period of 5–15 minutes. Under these temperature conditions the enzymes in the juice responsible for fermentation are destroyed.

The preserved raw juice may be concentrated later, e.g., by direct fired heating, or by spray drying to a powder. For a juice concentrated thirty times over the raw state, the specific gravity will be in the range of 15–22° Baumé measured at 25° C. Although the said juice would ordinarily be employed as a concentrated liquid, it should be borne in mind that the solid content (which is the active ingredient) varies widely according to the season and the age of the plants. Moreover, the juice may be shipped as spray dried solids. For uniformity, the preferred composition ranges hereinafter given will be described in terms of the sisal juice solids content. If the ultimate composition is an aqueous solution, these solids should form from 0.5–10%, although more concentrated solutions up to 30% may be made up for shipment, and diluted prior to use.

The second ingredient of the instant composition is an alkaline chelating agent of the amino carboxylic acid type. Ethylene diamine tetraacetic acid is perhaps the best known of these chelating agents. Other contemplated chelating agents are: ethylene diamine triacetic acid and beta hydroxyethyl ethylene diamine triacetic acid. The amino acid chelating agent may be conveniently added to the sisal juice in the from of an aqueous solution of its sodium salts. On a dry basis (or solids content) the chelating agent may be present in 0.5–10% concentration in the ultimate aqueous solution.

Since the strength of aqueous solution to be employed in any instance depends largely on the specific use, a more meaningful relation of the above named components is the dry basis ratio. The ratio of sisal juice solids to chelating agent should range from about 5:1 to 1:2.

An additional and highly desirable ingredient, particularly for cleansing use of the composition, is an alkyl aryl sulfonate or a long chain aliphatic (alkyl) sulfate or sulfonate. In each, the alkyl radical is a higher alkyl or aliphatic radical ($C_9$–$C_{18}$), frequently the dodecyl radical. This ingredient is added to the extent of 1–4% of the aqueous solution. On a dry basis this component should be from 0–50% of the combined weight of the other two components.

The aqueous solution composition would ordinarily be formulated by mixing concentrated solutions of the basic ingredient and then diluting with up to five volumes with water, depending of course on its application. The composition of all three ingredients is uniquely and unexpectedly effective in removing greasy films from various surfaces. Thus it may be utilized in combination with seawater to clean the oil from the walls of the storage tanks of oil tankers. It shows remarkable effectiveness in removing road film from automobile surfaces without injury to the finish of the car. In addition the product has found application in the cleaning of dairy utensils. In this application it readily removes "milkstone" and the fatty layer on dairy equipment which gives rise to the "milk" odor so characteristic of this industry. This problem has not been solved by the many detergent compounds and compositions that have been so prolifically available in recent decades.

Following are preferred examples of the practice of the instant invention.

*Example I*

Two parts of Nacconol SF (salt free) (this is a sodium alkyl-aryl sulfonate) was mixed with five parts of a 30% solution of ethylene diamine acetic acid and five parts of sisal juice concentrated to 30 times its initial volume, and 88 parts of tap water. The ingredients were mixed until all dissolved. If fiber is present from the sisal juice, the solution may be filtered. This solution froms a highly active, highly desirable cleansing composition, particularly good for removing greasy films and for the cleaning of dairy utensils.

*Example II*

Substantially the same cleansing solution can be made by mixing together two pounds of the Nacconol SF, one pound of spray dried residue of concentrated sisal juice, and 1½ pounds of dry tetrasodium salt of ethylene diamine tetraacetic acid (EDTA), and adding to sufficient water to make 100 lbs. of mixture.

*Example III*

In the dry composition mix of Example II, 1.5 pounds of the sodium salt of hydroxy ethyl ethylene diamine triacetic acid was substituted for the EDTA. This particular mixture does a good job of softening and whitening sisal fibers.

*Example IV*

20 parts by volume concentrated sisal juice was mixed with 10 parts by volume of 30% ethylene diamine tetraacetic acid solution (pH of 11) and sufficient water was added to form 100 parts. This same composition can be effected by combining four parts of the dried sisal solids, three parts of the sodium salt of ethylene diamine tetraacetic acid and sufficient water to make up 100 parts. This particular composition has found use in the froth flotation of copper ore. A small percentage of this composition in the water apparently acts to depress the flotation of silica and its consequent presence in the copper concentrate.

The above examples are given for exemplary purposes and not by way of limitation. Such further compositions and uses as will suggest themselves to workers in the art are expressly contemplated as falling within the scope of the appended claims.

What is claimed is:

1. A composition of matter essentially consisting of from 0.5 to 10% by weight of sisal juice solids; from 0.5 to 10% by weight of the sodium salt of a chelating agent selected from the group consisting of ethylene diamine tetraacetic acid, ethylene diamine triacetic acid and beta hydroxy ethyl ethylene diamine triacetic acid; and from 0 to 4% of a detergent selected from the group consisting of the higher alkyl-aryl sulfonates, the higher aliphatic sulfates, and the higher aliphatic sulfonates; the balance being water.

2. A composition of matter which on a water free basis essentially consists of sisal juice solids and the sodium salt of a chelating agent selected from the group consisting of ethylene diamine tetraacetic acid, ethylene diamine triacetic acid and beta hydroxy ethyl ethylene diamine triacetic acid, said components being present in a weight ratio of sisal solids to chelating agent ranging from about 5:1 to 1:2.

3. The composition of claim 2 wherein a detergent selected from the group consisting of a higher alkyl-aryl sulfonate, a higher aliphatic sulfate and a higher aliphatic sulfonate is present in quantities not exceeding 50% of the combined dry weight of the other two ingredients.

References Cited in the file of this patent

UNITED STATES PATENTS 2,012,641     Smead _____ Aug. 27, 1935

FOREIGN PATENTS 538,271     Great Britain _____ July 28, 1941
767,162     Great Britain _____ Jan. 30, 1957

OTHER REFERENCES

"Sequestrene," Geigy Industrial Chemicals, copyright 1952, pp. 1, 29, 35, 36, 42 and 43.